UNITED STATES PATENT OFFICE.

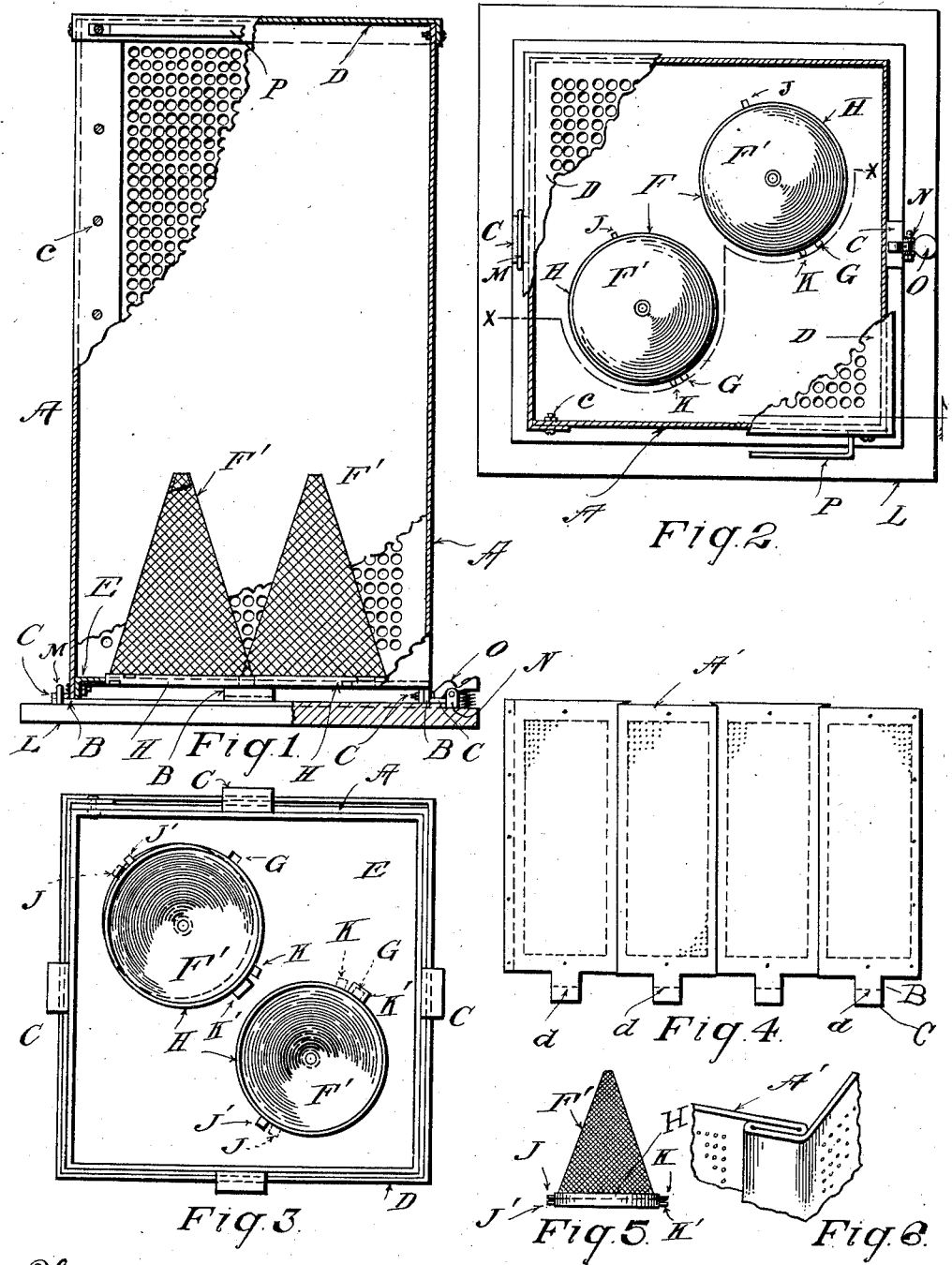

EDGAR L. MATTHEWS, OF PEORIA, ILLINOIS.

FLY-TRAP.

1,039,984.  Specification of Letters Patent.  Patented Oct. 1, 1912.

Application filed October 11, 1911. Serial No. 653,999.

*To all whom it may concern:*

Be it known that I, EDGAR L. MATTHEWS, a citizen of the United States, residing at Peoria, in the county of Peoria and State of Illinois, have invented certain new and useful Improvements in Fly-Traps; and I do hereby declare that the following is a full, clear, and exact description of the invention, which will enable others skilled in the art to which it appertains to make and use the same.

This invention relates to improvements in fly-traps particularly of the large type for "out of door" use as, for example, in front of stores and in locations where flies are found to congregate.

One of the objects of the invention is to construct a trap having a plurality of entrapping devices instead of a single one.

Another object is to construct a trap in which the entrapping device or cone is adapted for easy and quick removal for cleaning purposes.

A further object is to simplify the construction of a fly-trap, especially one of large size, and to provide a structure wherein, whether made of perforated or foraminated metal, or such as common wire screen, no supporting members will be required, merely the metal itself.

All of this will be clearly brought out in the following specification, aided by the accompanying drawing, in which:

Figure 1 is a side elevation of the trap, the same being shown in part section. Fig. 2 is a plan of the same showing a part broken away. Fig. 3 shows the bottom of the trap as seen from its under side. Fig. 4 is a plan of a metal blank out of which the body of the trap is formed. Fig. 5 is a side elevation of a cone, and Fig. 6 shows, in perspective, a portion of the blank shown in Fig. 4, much enlarged.

My trap is distinguished by its simplicity of construction and by the fact, also, that it is provided with a plurality of cones, I having shown but two, however, which are the entrapping portions, and by reason of the fact, also, that by the use of such plurality, a greater number of flies can be entrapped than by the use of a single cone.

A indicates the side walls or body of the trap which may be constructed in one or more parts but which, in the present instance, preferably consists of one piece, for example as indicated in Fig. 4, the same being adapted to be folded longitudinally to form the four sides, the free longitudinal edges of which are adapted to overlap as clearly shown in the first three figures, being secured by means of rivets or the like $c$. Preferably the lower ends of each of the sides is provided with an extension B to constitute a supporting leg and these are also preferably bent along the lines $d$, in Fig. 4, to constitute horizontal foot portions C, Figs. 1, 2 and 3.

The top of the trap consists preferably of a perforate plate D having its marginal edges folded down to form a rim to inclose the sides A, as shown in Fig. 1, and secured to the latter by rivets or the like.

Both the body and the top are preferably constructed of perforated metal rather than ordinary wire screen by reason of its ability to better withstand the action of the elements when used out of doors, and also to withstand heavy blows which such devices must naturally receive when standing out in the open. It is observed particularly in Fig. 4, that a series of holes is provided in each of the "zones" which form the sides of the trap and that these are spaced from the edges of the metal leaving the latter unweakened by perforations although if desired the entire sheet of metal may be perforated, it being preferable, however, to leave the lapping edges imperforate to obtain strength for riveting. The amount of light admitted to the trap will depend upon the size of the perforations and their proximity to one another and it is the desire, of course, to admit as much light as possible in order to attract the flies upward from beneath the trap where the bait is placed.

The bottom E of the body of the trap is preferably of imperforate metal, except for the openings for the cones to be described, and these openings are indicated at F. Said bottom is preferably provided with downturned marginal edges or flanges and it is of a size that will snugly fit the inner walls of the body, being set within the latter as indicated in Fig. 1 and secured by rivets or bolts or other good means.

The openings F for the cones are of such a diameter as to admit the bases of the entrapping devices or cones indicated by F'. It is observed that a notch G is cut in the metal bottom adjacent the holes F the purpose of which will appear presently. The said cones F' may be made of perforated metal or wire screen, I having indicated the latter in the drawing, and said cones at their bases are preferably provided each with a stiff metal rim H and projecting from the sides of the same are two pairs of lugs J J' K K' clearly indicated in Fig. 5, each pair lying in different parallel planes. In Fig. 3 one of the cones is shown slightly displaced in order to illustrate the positions of one of the pairs of lugs with regard to the bottom E. In this figure it is seen that, since viewing the trap from beneath, the lug J, which is the upper one, Fig. 5, will be the one farthest from the observer. In placing the cone in position these lugs J J' are placed at opposite sides of the bottom or so that the said bottom is inclosed between them. The cone is rotated until the opposite lug K is brought into register with the notch G into which it is made to drop, the cone being then seated in its normal position, the lug K' preventing it from entering farther. Now, by rotating the cone slightly to move said lug K away from the notch and engage the bottom, so as to prevent the cone dropping out when the trap is placed in upright position, the notch G becomes exposed and would perhaps permit the flies to escape. In order to prevent this the lug K' is made large enough to fully cover said notch as clearly shown. One of the lugs of each pair lies at opposite sides of the bottom and substantially at diametrically opposite sides of the cone and all of them act to prevent the cone from falling in or out, friction preventing said cone moving from its position even in the slightest degree.

Preferably, I provide a wooden bottom L for the trap upon which the extensions B C rest and I provide a staple or housing M in said bottom beneath which one of the feet C is placed while at the opposite side is pivoted, on a suitable support N, a spring-latch O which bears upon the adjacent foot portion C and acts to hold the trap and the bottom firmly together so that the entire device can be transported from place to place without danger of becoming separated and at the same time the arrangement described admits of very quickly removing the bottom in order to clean the trap or supply the bait for attracting the flies.

For the purpose of conveniently handling the trap I provide any sort of handle and for this purpose, in Figs. 1 and 2, a metal strap P bent into the form of a U provides a grasping piece, this being suitably secured to the top of the trap.

In constructing the body of the trap its sides may be bent at right angles to one another to form the corners illustrated in Figs. 1 and 2, or, as indicated in Figs. 4 and 6, the metal may be folded or recurved upon itself at the corners as very plainly shown in Fig. 6 thereby making an exceedingly strong structure each of which acts as a supporting post which is found to yield excellent results in practice and though not shown these may be extended into the legs or feet B described. Where it is desired to make use of ordinary wire screen which would not be stiff enough to form a rigid job without the use of suitable corner posts it is found that by recurving the metal in the manner shown, four thicknesses are placed together then stiffening all four corners. If the body is made round or cylindrical the same stiffening means may be employed.

I have intimated herein that the use of more than one cone F' is of advantage and this is by reason of the fact that said cones are made smaller and their sides can be made steeper than when a single large cone is used and the fly has a less distance to travel upwardly to the apex of the cone where he emerges through the opening into the body A. When the cone is large as is the practice in single-cone traps, in order that it shall not occupy too much space within the body it must be kept low or "squat." It is known that a fly for some reason more readily ascends vertical surfaces than slanting ones and the chances for his taking wing before reaching the apex are many and taking wing he is likely to fly downward and perhaps escape beneath the trap in the direction from which he came. In a large cone, then, the distance that the fly must crawl to the top is such that before reaching the top it is likely to take wing and perhaps escape as just stated. But in employing two cones of smaller diameter with comparatively steep sides and consequently comparatively a short distance between the base and apex the fly having entered the cone has but little distance to crawl and this, too, is on a very steep angle, and it reaches the opening at the apex before it is likely to take wing. Without providing a closure of any kind for the trap the cone by being removable constitutes the closure and the trap is more readily cleaned than when using a closure at the top and less cost is entailed in construction as well. Evidently, more than two of the cones may be used and but one of them need be removable and in fact I use but one in practice, the others being fixed in place. In the drawing I have shown both cones removable in order to better illustrate the structure employed for securing them in place.

The bait for the flies is placed upon the bottom L or in any usual holder such as a shallow pan but this, of course, forms no part of the present invention.

The top and sides are all perforated in order to make the interior of the trap attractive by light admitted thereto as in all other traps, and the bottom is imperforate except for the holes for the cones, only the light through these being used for attracting the flies. Since the light through these cones is the only attraction the flies will naturally arise within the latter and travel toward the light.

The trap, of course, may be round, as previously stated, or may be of such other forms as may be desired, since I do not confine myself to the square form shown. Neither, indeed, do I wish to confine myself to the exact structure described and shown, as to any of the parts since equivalents may readily be substituted.

Having thus described my invention I claim:

A fly trap comprising a body portion having a bottom formed with an opening therein and a single notch adjoining said opening, an entrapping member seated in the opening, a pair of lugs at one side of the member, one of them overhanging and spaced from the other and adapted to be inserted through said opening so that said lugs engage opposite sides of the bottom, and a pair of lugs on the member substantially opposite the first pair, one of them adapted to pass through the notch and engage the bottom, the other engaging the opposite side of the bottom and adapted to cover the notch when the member is turned into its locked position.

In testimony whereof I affix my signature, in presence of two witnesses.

EDGAR L. MATTHEWS.

Witnesses:
W. I. SLEMMONS,
C. L. JUSTICE.

Copies of this patent may be obtained for five cents each, by addressing the "Commissioner of Patents, Washington, D. C."